(12) United States Patent
Zhou

(10) Patent No.: US 10,412,134 B2
(45) Date of Patent: Sep. 10, 2019

(54) HOUSEHOLD DEVICE-USER GRAPH FOR DELIVERING CONTENT

(71) Applicant: Facebook, Inc., Menlo Park, CA (US)

(72) Inventor: Li Zhou, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 229 days.

(21) Appl. No.: 15/294,621

(22) Filed: Oct. 14, 2016

(65) Prior Publication Data
US 2018/0109578 A1 Apr. 19, 2018

(51) Int. Cl.
| | |
|---|---|
| *H04L 29/06* | (2006.01) |
| *H04N 21/436* | (2011.01) |
| *H04N 21/45* | (2011.01) |
| *H04N 21/442* | (2011.01) |
| *H04L 12/28* | (2006.01) |
| *H04L 29/12* | (2006.01) |
| *H04L 12/24* | (2006.01) |

(52) U.S. Cl.
CPC .......... *H04L 65/60* (2013.01); *H04L 12/2803* (2013.01); *H04N 21/43615* (2013.01); *H04N 21/44204* (2013.01); *H04N 21/4532* (2013.01); *H04L 41/12* (2013.01); *H04L 61/2038* (2013.01); *H04L 61/2514* (2013.01); *H04L 61/6004* (2013.01); *H04L 61/6022* (2013.01)

(58) Field of Classification Search
CPC ...................................................... H04L 65/60
See application file for complete search history.

(56) References Cited

U.S. PATENT DOCUMENTS

| | | | | |
|---|---|---|---|---|
| 9,584,335 | B1* | 2/2017 | Malasani | H04L 12/2816 |
| 2011/0258079 | A1* | 10/2011 | Ngan | G06Q 20/12 |
| | | | | 705/26.44 |
| 2015/0235275 | A1* | 8/2015 | Shah | G06Q 30/0269 |
| | | | | 705/14.66 |

\* cited by examiner

*Primary Examiner* — Moustafa M Meky
*Assistant Examiner* — Sm Z Islam
(74) *Attorney, Agent, or Firm* — Fenwick & West LLP

(57) ABSTRACT

An online system generates a household device-user graph, which links one or more household devices in a household with one or more users, each of whom having a user profile in the online system. The household device-user graph can be used for effective content delivery to users of the online system. The device-user graph generated by the online system describes connections between household device users and household devices in the target household and usage of the household devices by the household device users. Each household device user represented in the device-user graph is connected to one or more household devices represented in the device-user graph. The online system determines whether one or more household device users identified in the device-user graph are users of the online system, and updates the user profiles of the identified household device users in response to a determination that the identified household device users are users of the online system.

16 Claims, 7 Drawing Sheets

400

```
┌─────────────────────────────────────┐
│ Receive signals broadcasted from    │
│ household devices of a target       │
│ household via one or more user      │
│ devices                             │
│ 410                                 │
└─────────────────────────────────────┘
                  │
                  ▼
┌─────────────────────────────────────┐
│ Identify household devices and      │
│ users of the identified household   │
│ devices                             │
│ 420                                 │
└─────────────────────────────────────┘
                  │
                  ▼
┌─────────────────────────────────────┐
│ Generate a device-user graph based  │
│ on identification of household      │
│ devices and corresponding household │
│ device users                        │
│ 430                                 │
└─────────────────────────────────────┘
                  │
                  ▼
┌─────────────────────────────────────┐
│ Identify users of the online system │
│ based on the device-user graph      │
│ 440                                 │
└─────────────────────────────────────┘
                  │
                  ▼
┌─────────────────────────────────────┐
│ Update user profiles of the         │
│ identified users in the online      │
│ system                              │
│ 450                                 │
└─────────────────────────────────────┘
```

FIG. 4

HOUSEHOLD DEVICE-USER GRAPH FOR DELIVERING CONTENT

BACKGROUND

This disclosure relates generally to online content distribution, and more specifically to effectively delivering content to a target household using a device-user graph.

Content providers produce content that is targeted to certain audiences within online systems. Users interact with content received from the online system. With the advent of online systems such as social networking systems, content providers have increasingly relied on the online systems to effectively deliver content to their target users. Existing solutions of content delivery to a target household are not effective. For example, the content providers produce and send the content items to the target household without knowing what electronic devices are used by the household users to access content provided by the content providers, how the electronic devices in the household are associated with the household users, and whether the household users associated with the electronic devices in the household are users of the online system that help deliver the content from the content providers. Without such knowledge of the interconnections between the household electronic devices and their associated household users, most of content items that are sent to the target household are ignored by the household users. As a result, the content providers waste resources while sending the content items to the target household.

SUMMARY

An online system generates a household device-user graph, which links one or more household devices with a user having a user profile in the online system. The household device-user graph can be used for effective content delivery to users of the online system, e.g., delivering popular streaming videos to a user who is a frequent user of streaming devices (e.g., ROKU® streaming media player).

A household device is a networking electronic device used in a household, commonly shared by multiple users of the household. Examples of the household devices include a television, a home theater, a game device such as an XBOX®, a computer, a router, a media player, a streaming device or any suitable computing device. The online system receives signals broadcasted from household devices in a target household via one or more user devices. The signals broadcasted from a household device have information uniquely identifying the household device and information describing usage of the household device. For example, when a household device user is using a household device, the online system receives signals broadcasted from the household devices in a household, where the signals are detected by a user device associated with the household device users. The user device is a computing device capable of receiving user input as well as transmitting and/or receiving data via a network.

The online system identifies household devices based on the information uniquely identifying the household devices and users of the identified household devices based on the information describing the usage of the household devices. For example, a device-user graph module of the online system identifies each identifier associated with each household device and associated household device information, and assigns a device ID associated with the device identifier. The device-user graph module identifies household device users associated with the device IDs, and assigns a device user ID to each identified household device user. The online system generates a device-user graph based on identification of household devices and corresponding household device users. For example, the device-user graph module generates a device-user graph based on device IDs and device user IDs. Each household device has a sync-up history, which stores information describing the usage of the household device and its corresponding household users. Similarly, each household device user may also have a sync-up history, which stores information describing the household user's usage of various household devices.

In response to receiving a request to provide content items to a household of users from a content provider by the online system, e.g., Netflix, to present the content to a target household, the online system identifies users of the online system based on the device-user graph, selects one or more content based on user profile information identified users in the device-user graph, e.g., interests, demographics, actions on the online system, and delivers the selected content to the identified users in the target household.

BRIEF DESCRIPTION OF THE DRAWINGS

FIG. 4 is a flowchart illustrating a process for generating a device-user graph for a target household, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1A:
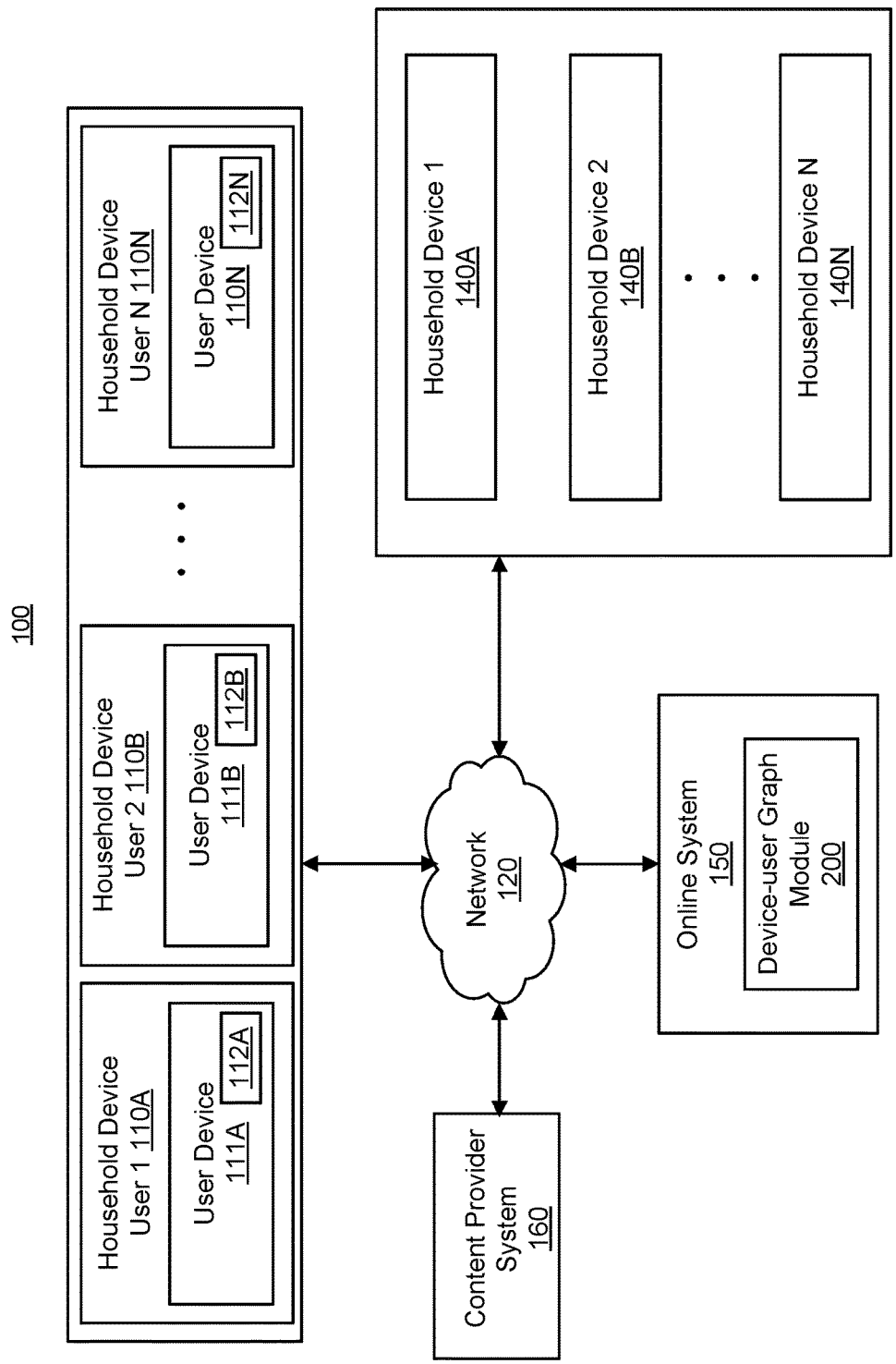
FIG. 1A is a system environment of an online system including a device-user graph module, in accordance with an embodiment.

FIG. 1A is a system environment 100 of an online system including a device-user graph module. In the embodiment shown in FIG. 1A, the system environment 100 includes one or more household device users 110 (e.g., 110A and 110N), one or more user devices 111 (e.g., 111A and 111N), one or more household devices 140 (e.g., 140A and 140N), an online system 150, and a content provider system 160 connected through a network 120. Each household device user 110 uses a user device 111 (e.g., a mobile phone) to interact with the online system 150 and the content provider system 160, e.g., interact with content provided by the content provider system 160. In the embodiment shown in FIG. 1A, each user device 111 used by a household user has a software application module 112, which executes a computer application on the use device for detecting one or more household devices 140. It should be appreciated that any number of these entities (including millions) may be included. In alternative configurations, different and/or additional entities may also be included in the system environment 100.

A household device, e.g., 140A, is a networking electronic device used in a household that is commonly shared by more than one user to provide content (often media content, like TV programs, movies, games) to the household. For example, a household device is often a device on which the household or a family has a family or household account (e.g., a TV subscription), as opposed to a personal device like a mobile phone, where one user typically has an account, and the device is owned and primarily used by that one user. The household devices (e.g., a television, a home theater, a game device such as an XBOX®, a computer, a router, a media player, a streaming device or a computing device) receive data provided by the online system 150 and/or the content provider system 160 and provide the received data to the household users 110. In some embodiments, the household device 140 is an electronic device to perform functions such as executing software applications, receiving digital content, presenting webpages from websites hosted by web servers on the network 120, downloading files, and the like.

A household device 140 is uniquely identified by an identifier, e.g., device identification (ID) provided by the manufacturer of the household device. A household device 140, when activated, broadcasts wired and/or wireless signals, which can be received and analyzed by, e.g., the user device 111, for detection of the presence of the household device 140 in the household. For example, the signals from a household device 140 using wireless communication protocols, e.g., BLUETOOTH, can include information such as the media access control (MAC) address of its wireless interface, vendor of the household device 140, class of device indicating the type of the household device. The signals from a household device 140 allow the user device 110 to identify the household device 140 uniquely.

The user device 111 is a personal computing device capable of receiving user input as well as transmitting and/or receiving data via the network 120. For example, the user device 110 may be a mobile device, a tablet (a pad), a notebook, a desktop computer, a laptop computer, a personal digital assistant (PDA), a gaming device, a portable computer, or other personal electronic devices including computing functionality and data communication capabilities. The user device 111 provides a user interface (UI), such as physical and/or on-screen buttons with which a user may interact with the user device 111 to perform functions such as viewing, selecting, and consuming digital content such as digital records, webpages, photos, videos and other content. For example, the user device 111 executes a browser application to enable interaction between the client device 110 and the online system 150 via the network 120. In another embodiment, a user device 110 interacts with the online system 150 through an application programming interface (API) running on a native operating system of the user device 110, such as IOS® or ANDROID™.

In one embodiment, a user device 111 executes a software application module 112, allowing a user of the user device 111 to interact with the online system 150 and the household devices 140. For example, a user device 111 executes the software application module 112 to receive and analyze signals broadcasted by the household devices 140. In one embodiment, from the analyzed signals of the household devices 140, the user device 111 detects the presence of the household devices 140 and provides the detection to the online system 150 for further analysis. Alternatively, the user device 111 provides the received signals from the household devices 140 to the online system 150 for further processing such as building a household device-user graph, which links one or household devices 140 to a user having a user profile in the online system 150.

A household device user, e.g., 110A, is a user using one or more household devices 140 in the household. A household device user may be a user of the online system 150, and has a user profile established in the online system 150. A household device user can be a user who is not a user of the online system 150 and does not have a user profile established in the online system 150. In some embodiments, the household device user 110 interacts with the household device 140 via a user device 111, e.g., a mobile phone. The user device 111 is associated with a software application module 112 (e.g., 112A for the household user 110A and 112N for the household user 110N) for executing one or more software applications, which detects the presence of the household devices 140 as described above and interactions between the household device user 110 and the household devices 140. In other embodiments, the software application module 112 can be installed in one or more household devices 140.

In some embodiments, the household device user 110 accesses the content provided by the online system 150 via the household devices 140, e.g., watching a streaming video and content provided by the online system 100 on an APPLE TV®, or playing a multi-player online video game on a XBOX®.

The network 120 facilitates communications among one or more user devices 111, the household devices 140, the online system 150, and/or one or more content provider system 160. The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

Figure 1B:
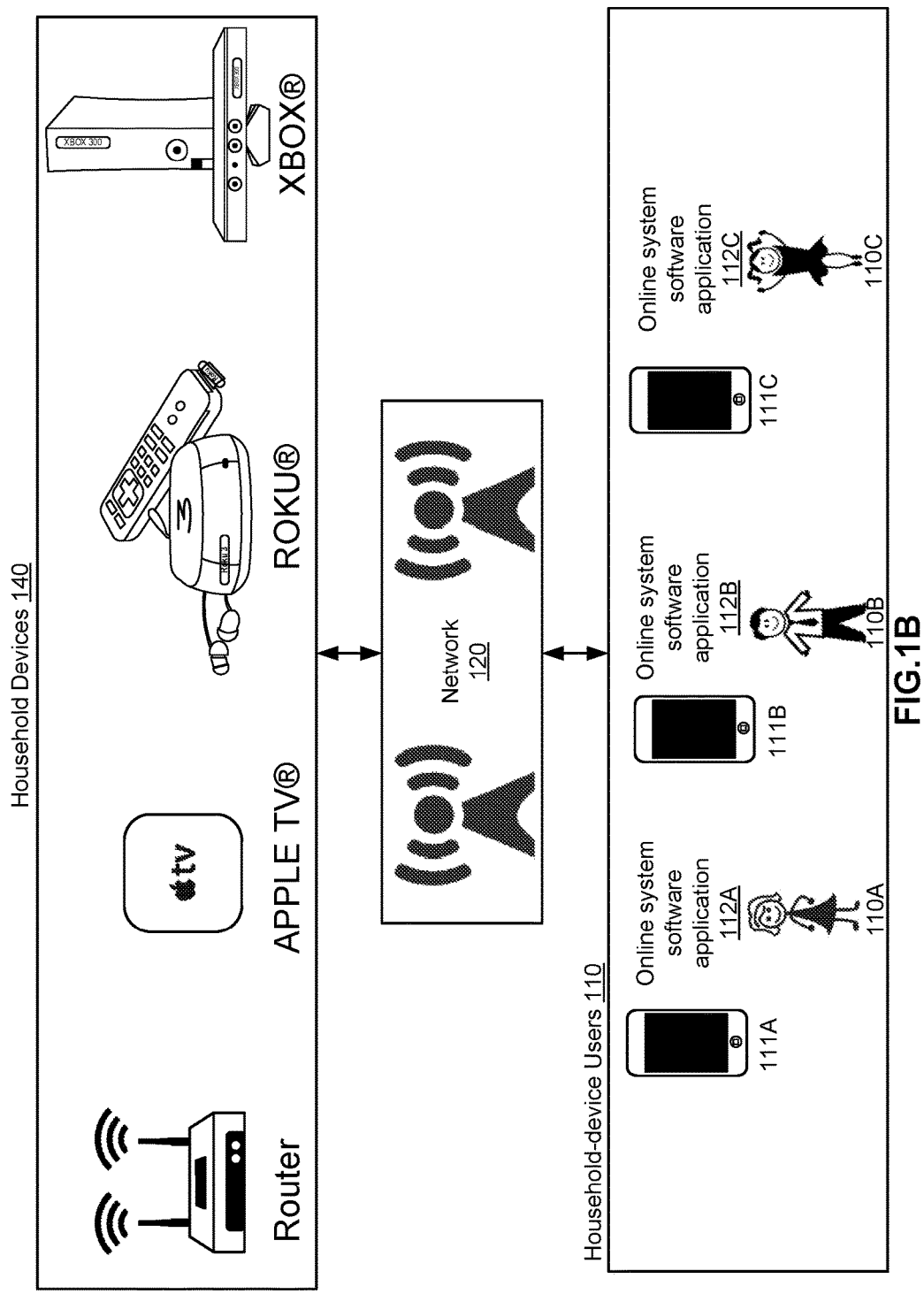
FIG. 1B shows examples of household devices and household users of the system environment illustrated in FIG. 1A, in accordance with an embodiment.

Turning now to FIG. 1B, FIG. 1B shows examples of household devices 140 and household device users 110 of the system environment 100 illustrated in FIG. 1A, in accordance with an embodiment. As shown in FIG. 1B, the household devices 140 include a router, an APPLE TV®, a ROKU® streaming media player, and an XBOX® for video games. Each household device user is associated with a software application installed on a mobile phone of a household device user. For example, the household device users 110A, 110B and 110C have mobile phones 111A, 111B and 11C installed with an online system software application 112A, 112B, and 112C, respectively. Each household device has a unique identifier for identifying the household device. Examples of the unique identifier for each household device 140 include a device universally unique identifier (UUID), a public Internet Protocol address (IP address), private IP address, a media access control address (MAC address), or any other suitable identifier identifying a household device 140 that participates in communications in the network 120. A household device 140, when activated, broadcast wired and/or wireless signals to other household devices 140 and the user device 111. The signals from a household device 140 includes information, e.g., MAC address, that can be used by the software module 112 of a user device 111 to detect the presence of the household device 140 in a household. The online system 150 uses the information of household devices 140 detected by one or more user devices 111 to build a household device-user graph for effective content delivery, which is further described below.

The network 120 allows exchanging data among the household devices 140 and the network 120 using the unique identifier assigned to each household device 140. For example, the router passes data such as web pages, media content between other household devices 140 to the network 120 via a public IP address assigned to the router. The APPLE TV® and ROKU® receive media content (e.g., video, music, audio) from the network 120 via the router and provide the received media content to one or more appliances (e.g., a television, a home theater, a computer, or mobile phones) via a respective private IP address assigned to the APPLE TV® and the ROKU®. The XBOX® is a game device allowing players to play games online and to purchase and download games and various forms of multimedia (e.g., music, movie, audio, or television program) from the network 120 via a private IP address assigned to the XBOX®. The network 120 not only provides data to the household devices 140, as described above, the network 120 also receives data from the household devices 140. For example, the network 120 receives general information associated with each household device 104. Examples of the general information include serial number, model number, device name, manufacture, user information associated with each device, other suitable information associated with each device, or some combination thereof.

Turning back to FIG. 1A, the content provider system 160 is used by content providers for interacting with the online system 150. Examples of interactions include providing content, components of the content (e.g., images, videos, textual description), and information related to the content and their components. In some embodiments, the content provider system 160 has a client application and a content item (not shown in FIG. 1A). The content provider system 160 interacts with the online system 150 using application programming interfaces (APIs) of the online system 150. The client application allows users associated with content provider system 160 to interact with the online system 150. The client application may present a user interface allowing interactions with the users.

The online system 150 communicates via the network 120 with the content provider system 160, and/or with one or more household devices 140 and user devices 111 used by the household device user 110. In one embodiment, the online system 150 receives a content item from the content provider system 160 for a target user, e.g., the household device user 111A in FIG. 1B, and delivers the content item to the target user. In another embodiment, the online system 150 receives a set of components of content from the content provider system 160, e.g., five images showing a pair of running shoes, and dynamically creates the content upon receiving a request for presentation of the content. The online system 150 delivers the content item to an identified household device user in a target household based on a device-user graph generated by a device-user graph module 200. The device-user graph module 200 is further described with reference to FIGS. 2-4.

The online system 150 additionally permits users of the online system 150 to establish connections (e.g., friendship type relationships, follower type relationships, etc.) with other users of the online system 150. In one embodiment, the online system 150 stores user accounts and/or user profiles describing the users of the online system 150. A user profile of a user is associated with a user account and includes information describing the corresponding user, such as demographic data (e.g., gender information), biographic data (e.g., interest information), etc. Using information in the user profiles, connections between users, and any other suitable information, the online system 150 maintains a social graph of nodes interconnected by edges. Each node in the social graph represents an object associated with the online system 150 that may act on and/or be acted upon by another object associated with the online system 150. An edge between two nodes in the social graph represents a particular kind of connection between the two nodes. An edge may indicate that a particular user of the online system 150 has shown interest in a particular subject matter associated with content. For example, the user profile may be associated with edges that define a user's prior activity that includes, but is not limited to, visits to various web pages, searches for web pages, commenting and sharing web pages, liking content items, commenting on content items, sharing content items, joining groups, attending events, checking-in to locations, and buying products advertised by advertisements presented to the user.

In one embodiment, the online system 150 may use edges to generate stories describing actions performed by users, which are communicated to one or more additional users connected to the users through the online system 150. For example, the online system 150 may present a story to an additional user about a first user (e.g. a friend) that has liked a new game or application advertised by a content item presented to the first user. The additional user may choose to interact with the presented story thereby creating an edge in the social graph maintained by the online system 150 between the additional user and the subject matter of the story. The online system 150 may store this edge in an edge store (not shown). This edge may be retrieved from the edge store at a future time point when the online system 150 seeks to identify components that may align well with the additional user's preferences.

In various embodiments, in addition to receiving one or more content items from the content provider system 160, the online system 150 may also receive one or more requests for publishing content provided by the content provider system 160 to a target user in a target household. In various embodiments, the request includes a landing page specifying a network address to which a target user is directed when the content is accessed. The request from the content provider system 160 also includes a bid amount associated with the content. The bid amount is used to determine an expected value, such as monetary compensation, provided by the content provider system 160 to the online system 150 if the content is presented to the target user, or receives a user interaction, or based on any other suitable condition. The online system 150 presents the requested content on or through a household device 140 associated with the target user, e.g., on APPLE TV® through the router to user 110A shown in FIG. 1B.

Device-User Graph Module

The online system 150 generates a household device-user graph associated with a target household, which links one or more household devices with a user having a user profile in the online system 150. The household device-user graph can be used for effective content delivery to users of the online system 150 in a household, e.g., delivering popular streaming videos to a user who is a frequent user of streaming devices (e.g., ROKU® streaming media player). In one embodiment, the online system 150 has a device-user graph module 200 to generate a device-user graph for each target household. The device-user graph associated with a target household can be used by the online system 150 to deliver content received from the content provider system 160 to one or more identified users of the online system 150 in the target household. The device-user graph generated by the device-user graph module 200 describes connections between the household device users 110 and household devices 140 in a target household; in other words, each household device user 110 represented in the device-user graph is connected to one or more household devices 140 represented in the device-user graph. The device-user graph module 200 determines whether one or more household device users 110 identified in the device-user graph are users of the online system 150, and updates the user profiles of the identified household device users in response to a determination that the identified household device users are users of the online system 150. In another embodiment, the online system 150 also generates a household device-user graph associated with a target household, which links one or more household devices with a user who does not have a user profile in the online system 150. The online system 150 may also establish a profile for the user based on the information derived from the household device-user graph.

Figure 2:
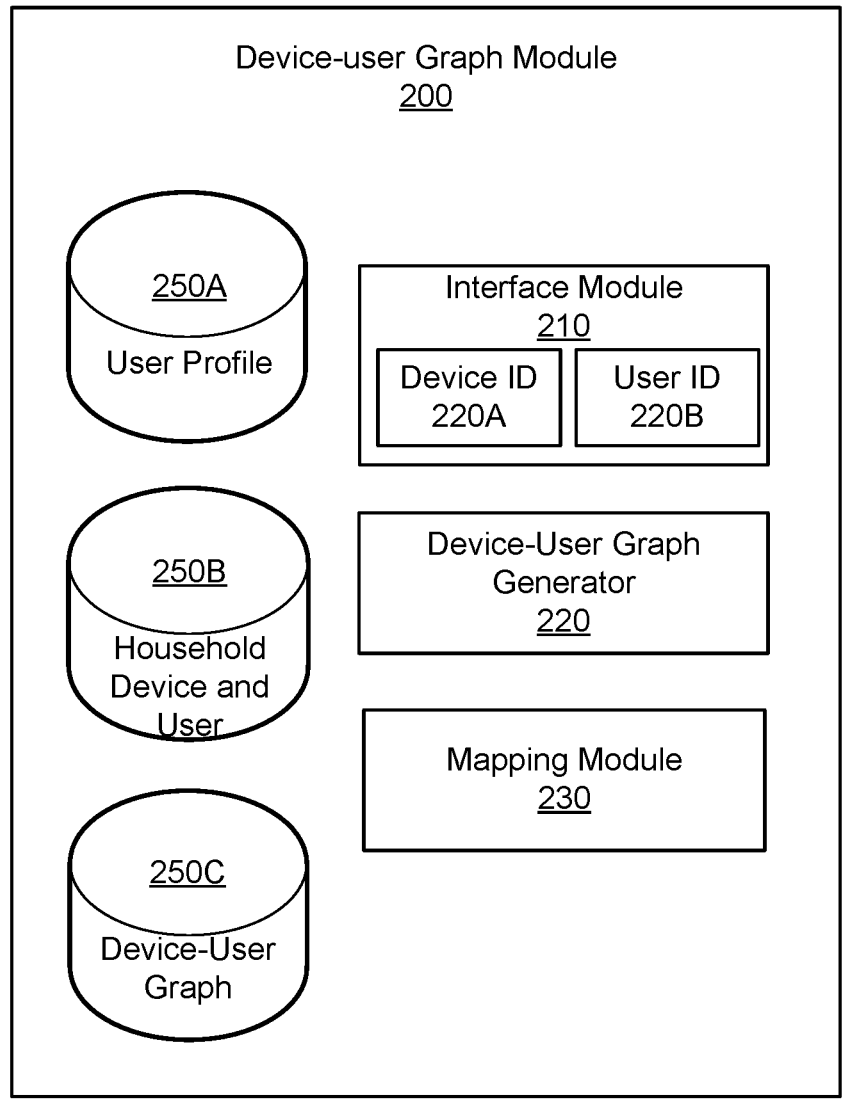
FIG. 2 is a block diagram of a device-user graph module of an online system, in accordance with an embodiment.

FIG. 2 is a block diagram of a device-user graph module 200 of the online system 150, in accordance with an embodiment. In the embodiment shown in FIG. 2, the device-user module 200 includes an interface module 210, a device-user graph generator 220, a mapping module 230, a user profile store 250A, a household device and user store 250B, and a device-user graph store 250C. In alternative configurations, less, different and/or additional entities may also be included in the device-user graph module 200. In some embodiments, the user profile store 250A can be external to the device-user graph module 200. In some embodiments, the device-user graph module 200 can include a content delivery module to deliver the content item generated based on the identified household device user to the target household.

The interface module 210 facilitates communications among one or more household devices 140, one or more software application modules 112 associated with the user devices 111 of household device users 110, and the network 120. Additionally, the interface module 210 facilitates communications among the device-user graph generator 220, mapping module 230, the user profile store 250A, the household device and user store 250B, and the device-user graph store 250C. In one embodiment, the interface module 210 interacts with the household devices 140 via the network 120. For example, the interface module 210 receives information about signals broadcasted from one or more household devices 140 from the software application module 112 of the user devices 111 of the household device users 110, and provides the received information to the device-user graph generator 220 for further processing. The one or more household devices 140 are being used by one or more household device users 110. For example, a first household device user 110A is using an APPLE TV® to view content provided by the content provider system 160. A second household device user 110B is using a streaming media player (e.g., ROKU®) to receive streaming media provided by the content provider system 160. The first household device user 110A, or the second household device user 11B or both users can be users of the online system 150 and have corresponding user profiles with the online system 150.

In the embodiment shown in FIG. 2, the interface module 210 includes a device ID module 220A and a user ID module 220B. The device ID module 220A identifies each identifier (e.g., UUID, public IP address, private IP address, and MAC address) associated with each household device 140 from the received broadcasted signals of the household devices 140. The device ID module 220A extracts household device information associated with the each device identifier from the received broadcasted signals. The household device information includes serial number, model number, device name, manufacture information, or any other suitable information associated with each device. The device ID module 220A may store the device identifier and the household device information of each household device 140 in the household device and the user store 250B.

The user ID module 220B identifies household device users associated with the device IDs, extracts user information associated with the identified household device user, and sorts the user information. For example, a household device 140A is being used by a household device user 110A and by another household device user 110B. The user ID module 220B identifies the household device users (110A-B) associated with the household device 140A, extracts the household device user (110A) information and the household device user (110B) information associated with the household device 140A. The user ID module 220B assigns a first user ID to the household device user (110A), and assigns a second user ID to the household device user (110B). Each user information associated with the household device 140 includes demographic data (e.g., gender information), biographic data (e.g., interest information), usages of the household device including a timestamp of each usage, connections between the household device user and other household device users, connections between the household user and other non-household device users (e.g., visitors to the target household), other suitable information associated with the household device user, or some combination thereof. The user ID module 220B stores the user IDs associated with the household device user in the household device and the user store 250B.

The device-user graph generator 220 generates a device-user graph based on information of the household devices 140 and corresponding household device users 110. For example, the device-user graph generator 220 generates the device-user graph based on device IDs and user IDs received from the interface module 210. The generated device-user graph describes connections between the household device users 110 and household devices 140. Each connection between a household device user 110 and a household device 140 is associated with a corresponding sync-up history. In one embodiment, each household device user 110 and each household device 140 has a corresponding sync-up history. The sync-up history associated with a household device 140 defines a list of timestamps describing usage of the household device 140 used by the household device users 110 at different times. Similarly, the sync-up history associated with a household device user 110 defines a list of timestamps describing the household device user 110 using various household devices 140 at different times. Examples of information included in the device-user graph includes each household device information, each user information associated with each household device, connections and affinities between household device users, connections between household device users and non-household device users, sync-up histories associated with household devices and sync-up histories associated with household device users, other suitable information associated with the device-user graph, or some combination thereof.

In one embodiment, the device-user graph is implemented in a multi-node graph structure, and the household device users 110 and the household devices 140 are represented as different types of nodes in the device-user graph. A household device user 110 represented in the device-user graph is connected to one or more household devices 140 represented in the device-user graph indicating that the user 110 has used the household devices 140. A household device 140 represented in the device-user graph is also connected to one or more households devices users 110 represented in the device-user graph indicating that the household device 140 has been used by one or more the household device users 110.

For example, if a first household device user 110A is using a first household device 140A (e.g., an APPLE TV®), and a second household device 140B (e.g., a ROKU® streaming media player), and a second household device user 110B is using the first household device 140A with the first household device user 110A together, the device-user generator 220 establishes a first connection between the household device user 110A and the household device 140A, a second connection between the household device user 110A and the household device 140B, and a third connection between the household device user 110B and the household device 140A, represented in the device-user graph.

Figure 3:
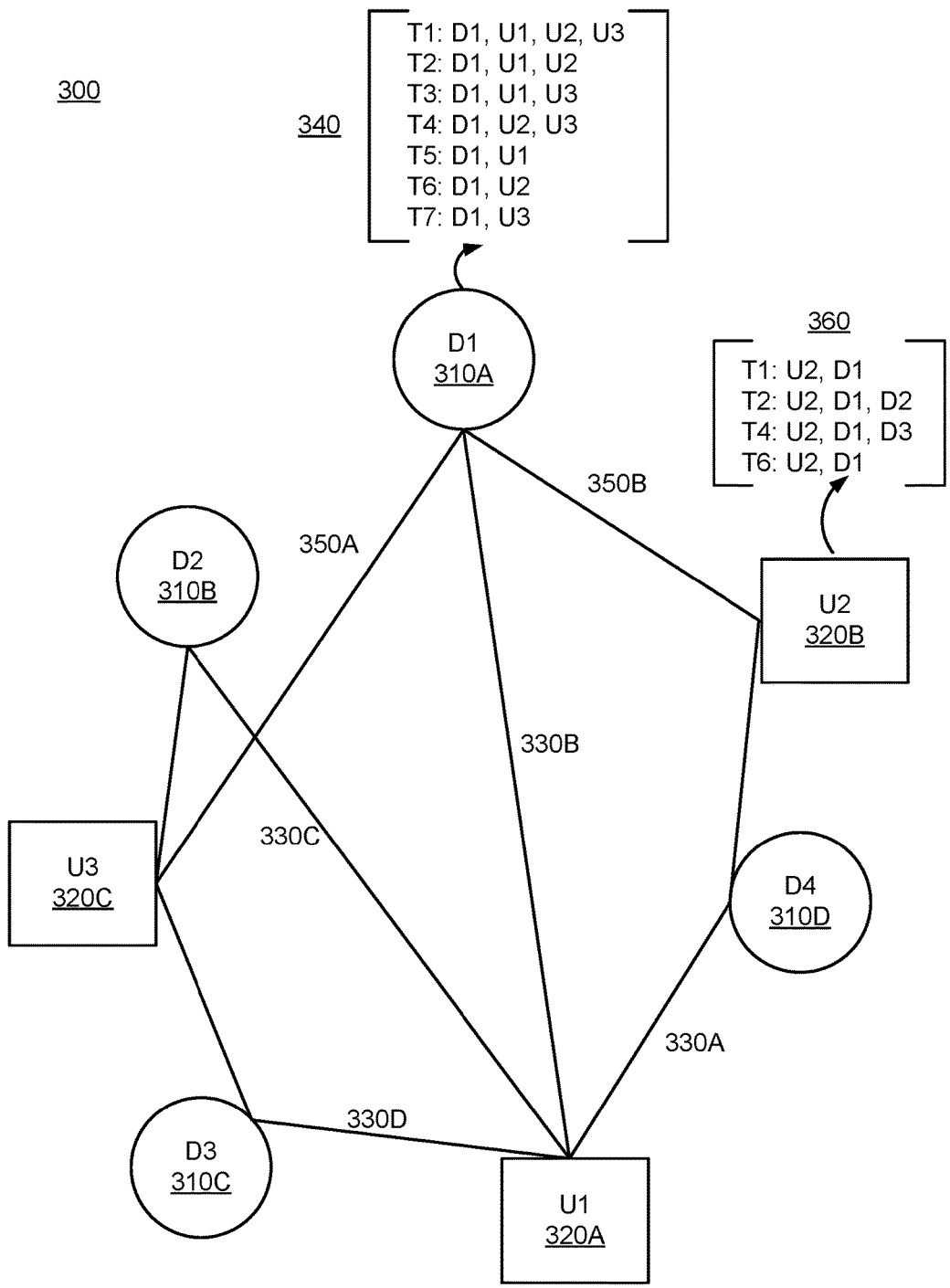
FIG. 3 shows examples of a device-user graph and a sync-up history generated by the device-user graph module illustrated in FIG. 2, in accordance with an embodiment.

Turning now to FIG. 3, FIG. 3 shows examples of a device-user graph 300 and a sync-up history 340 associated with the household device D1 and a sync-up history 360 associated with the household user U2 generated by the device-user graph module 200 illustrated in FIG. 2, in accordance with an embodiment. In the embodiment of FIG. 3, the household devices 140 (e.g., D1-D4) and the household device users 110 (e.g., U1-U3) are represented by different types of nodes in the device-user graph 300. For example, each household device 140 and each household device user 110 are represented as a circle and square, respectively. Each household device user 110 represented in the device-user graph 300 is connected to one or more household devices 140. For example, a household device user U1 (320A) is connected to household device users D1-D4 (310A-D) via connections 330A-D. Each household device 140 represented in the device-user graph 300 is also connected to one or more households devices users 110. For example, a household device D1 (310A) is connected to household device users U1-U3 (320A-C) via connections 350A-B and 330B. Each connection between a household device user 110 and a household device 140 is recorded in a sync-up history associated with the household device 140 and the sync-up history associated with the household device user 110. For example, the sync-up history 340 of the household device D1 (310A) represents which household device users 110 are using D1 (310A) at different timestamps, e.g., at T1 timestamp, U1-U3 (320A-C) using D1 (310A), at T2 timestamp, U1-U2 (320A-B) using D1 (310A), at T7 timestamp, only U3 (320C) using D1 (310A). Similarly, the sync-up history 360 of the household device user U2 (320B) represents which household devices 140 are used by U2 (320B) at different timestamps, e.g., at T1 timestamp, U2 using D1 (310A), at T2 timestamp, U2 using D1 (310A) and D2 (310B), at T6 timestamp, U2 only using D1 (310A).

Turning back to FIG. 2, the mapping module 230 identifies users of the online system 150 among the household device users 110 described in the device-user graph received from the device-user graph generator 220. For example, the mapping module 230 retrieves information associated with the identified household device users 110 from the received device-user graph, and determines whether each identified household device users 110 has a user profile established with the online system 150, e.g., searching the user profile store 250A based on the information associated with the identified household device users 110. Responsive to a determination that an identified household device users 110 has a user profile with the online system 150, the mapping module 230 updates user profiles of the identified user in the online system 150, e.g., adding device IDs of the household devices 140 used by the identified user.

The mapping module 230 retrieves additional information associated with the household device user 110A from the device-user graph. Examples of retrieved information include device IDs associated with the household device user 110A, user IDs associated with the household device user 110A, connections associated with the household device user 110A, sync-up histories associated with the household device user 110A, or some combination thereof. The mapping module 230 updates user profiles of the identified users in the online system 150 based on retrieved information associated with the identified users, and stores the retrieved information associated with the identified users into user profile store 250A.

FIG. 4 is a flowchart illustrating a process 400 for generating a device-user graph for a target household by the online system 150, in accordance with an embodiment. The process 400 may include different or additional steps than those described in conjunction with FIG. 4 in some embodiments or perform steps in different orders than the order described in conjunction with FIG. 4.

The online system 150 receives 410 signals broadcasted from household devices 140 in a target household via one or more user devices. The signals broadcasted from the household devices 140 have information uniquely identifying the household devices 140 and information describing usage of the household devices 140. For example, when a household device user 110A is using a household device 140, the device-user graph module 200 of the online system 150 receives signals broadcasted from the household devices 140 in a household, where the signals are detected by the user device 111 associated with the household device users 110. The online system 150 identifies 420 household devices based on the information uniquely identifying the household devices and users of the identified household devices in the household based on information describing the usage of the household devices. For example, the device-user graph module 200 of the online system 150 identifies each identifier associated with each household device 140 and associated household device information, and assigns a device ID associated with the device identifier. The device-user graph module 200 identifies household device users associated with the device IDs, and assigns a user ID to each identified household device user. The online system 150 generates 430 a device-user graph associated with the household based on identification of household devices and corresponding household device users. For example, the device-user graph module 200 generates a device-user graph based on device IDs and user IDs, as described with reference to FIGS. 2-3. The online system 150 identifies 430 users of the online system 150 among the corresponding household device users, and each identified user of the online system has a user profile with the online system. The online system 150 updates 440 user profiles of the identified users in the online system 150 based on the generated device-user graph. The updated user profile of a user has information describing connections between user and one or more identified household devices in the household. For example, the updated user profile has information describing each usage by the corresponding user of the identified household devices in the household and a timestamp of each usage.

Example Application of a Device-User Graph for a Target Household

Figure 5:
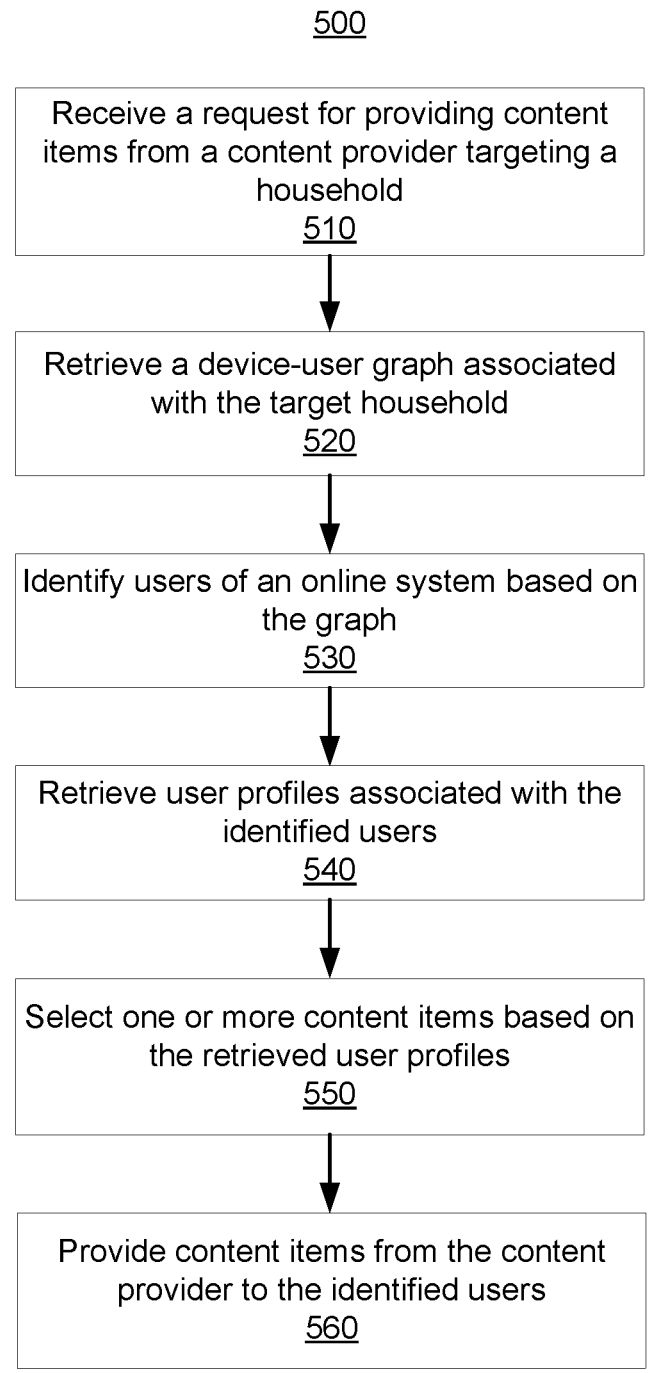
FIG. 5 is a flowchart illustrating a process for providing content items to a target household by an online system using a device-user graph associated with the target household, in accordance with an embodiment.

FIG. 5 is a flowchart illustrating a process 500 for providing content to a target household by the online system 150 using a device-user graph associated with the target household, in accordance with an embodiment. The process 500 may include different or additional steps than those described in conjunction with FIG. 5 in some embodiments or perform steps in different orders than the order described in conjunction with FIG. 5.

The online system 150 receives 510 a request to providing content items (e.g., content) from a content provider 160 to a household of users. The online system 150 retrieves 520 a device-user graph associated with the target household. For example, the online system 150 retrieves the device-user graph from the device-user graph store 250C in the device-user graph module 200. The online system 150 identifies 530 users of the online system 150 based on the retrieved device-user graph and based on at least one of the identified users being a user of the online system. The online system 150 retrieves 540 user profiles associated with the identified users that are also users of the online system. For example, the online system 150 retrieves user profiles associated with the identified users from the user profile store 250A. Examples of the retrieved user profile include demographic data (e.g., gender information), biographic data (e.g., interest information), connections and affinities between the identified user and other online system users, device IDs associated with the identified user, user IDs associated with the identified user, connections and affinities between the identified user and other household device users, sync-up histories associated with the identified user, or some combination thereof. The online system selects 550 one or more content items based on the retrieved user profiles. The online system 150 provides 560 the content items from the content provider 160 to the identified users. For example, the one or more content items are selected based on interest information of the identified users indicated by the usage of the household devices 140 associated with the identified users. The online system 150 provides the selected content items to the identified users.

Figure 6:
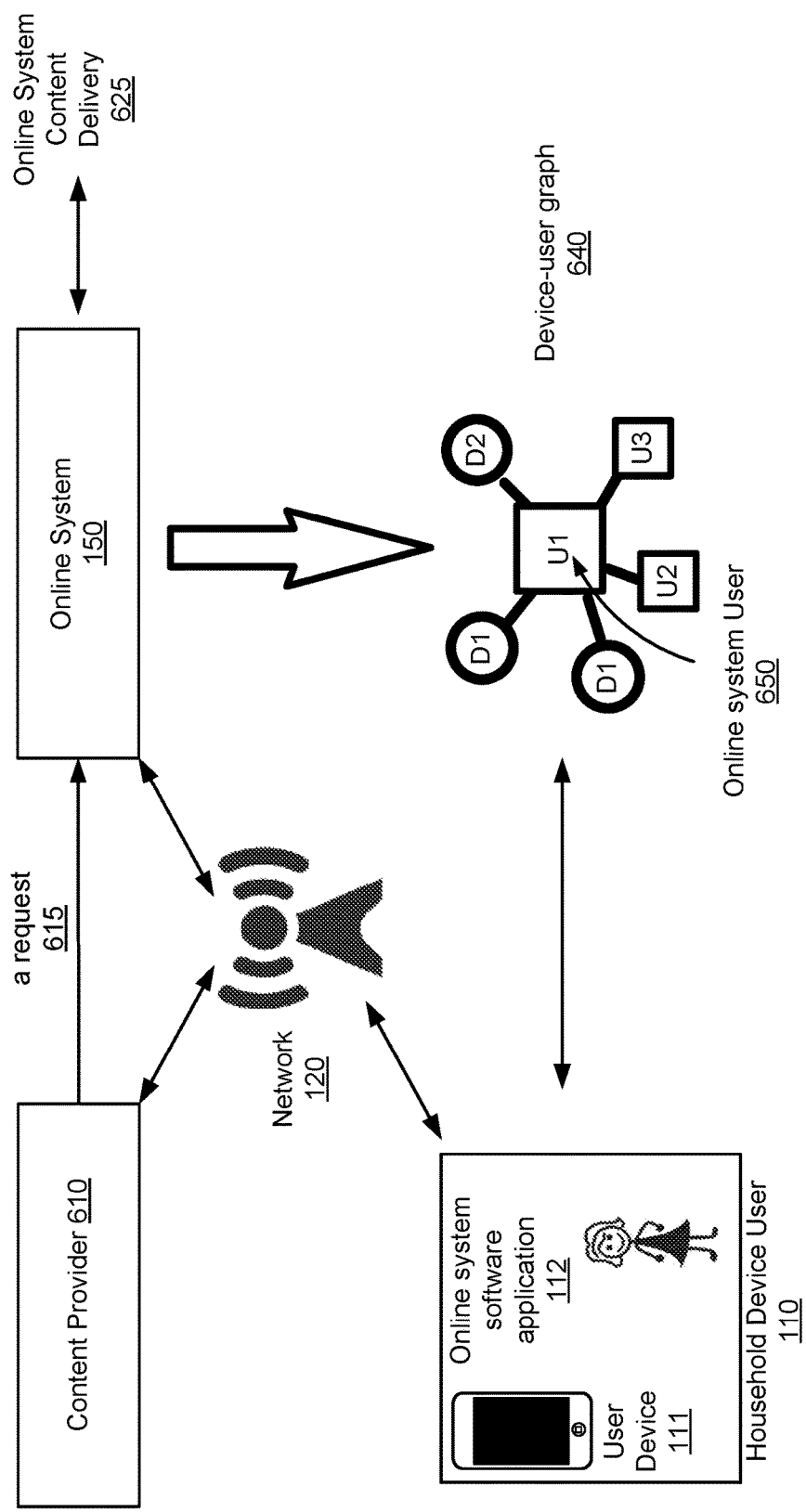
FIG. 6 shows an example of providing content items to a target household by an online system using a device-user graph associated with the target household, in accordance with an embodiment.

FIG. 6 shows an example of providing content items from a content provider 610 to a target household by the online system 150 using a device-user graph 640 associated with the target household, in accordance with an embodiment. For example, in the embodiment of FIG. 6, the content provider 610 sends a request 615 to the online system 150 for publishing one or more content items to users living in the target household. In some embodiments, the content provider 610 provides one or more content items ready for publishing and\or components of the content items to be dynamically created by the online system 150.

In the embodiment of FIG. 6, a device-user graph 640 associated with the target household is retrieved by the online system 150. The online system 150 identifies an online system user 650, who has a user profile with the online system 150, and the online system user 650 is a household device user 110 described by the device-user graph 640. The online system 150 retrieves a user profile associated with the online system user 650 (a household device user 110). Based on the retrieved user profile of the household device user 110, the online system 150 provides contents items to the household device user 110 by presenting the content items the user device 111 associated with the user 650 or a household device, e.g., APPLE TV®. The household device user 110 can access and view the content items, recommend the content items to other users, comment on the content items, execute a transaction in response to viewing the content items, and the like.

In some embodiments, the online system 150 customizes content items, e.g., using the components of the content items provided by the content provider 610, based on the retrieved user profiles of the identified users. The online system 150 provides the customized content items to the identified users. In some embodiments, the online system 150 provides the user information (e.g., the sync-up history associated with the user) and household information based on the device-user graph of the target household to the content provider 610 for customizing the content items that are more likely of interest to the user in the target household. In one embodiment, the content provider 610 may create content items based on user profiles of the identified users in the target household, and provides the created content items to the online system 150 for delivering to the identified users in the target household. In an alternative embodiment, the content provider 610 may create content items based on household information and may provide content items for presenting on the household devices in the target household. For example, the household information based on the device-user graph indicates most of the household device users use APPLE TV® frequently during the weekend. The content provider 610 may provide content items to the target household during the weekend for displaying on the APPLE TV®.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, from one or more user devices by an online system, signals broadcasted from one or more household devices in a household and detected by the one or more user devices, the signals broadcasted from a household device having information uniquely identifying the household device and information describing usage of the household device;
   identifying the one or more household devices based on the information uniquely identifying the household devices and users of the identified household devices in the household based on the information describing the usage of the household devices;
   generating a device-user graph associated with the household device based on identification of the household devices and corresponding household device users;
   identifying one or more of the corresponding household device users as one or more users of the online system by searching a user profile store maintained by the online system, each identified user of the online system having a user profile in the user profile store; and
   providing content for presentation by the online system to each identified user of the online system, the content selected based on information in the user profile and the device-user graph of the identified user.

2. The method of claim 1, wherein identifying the one or more household devices based on the information uniquely identifying the household devices and users of the identified household devices in the household based on the information describing the usage of the household devices comprises:
   analyzing the signals broadcasted from the one or more household devices in the household to obtain information describing the one or more household devices; and
   analyzing signals broadcasted from the one or more household devices in the household to obtain information describing the usage of the one or more household devices by one or more corresponding users of the household devices.

3. The method of claim 2, wherein the information describing the one or more household devices comprises at least one of:
   a device universally unique identifier (UUID) uniquely identifying a household device; a public Internet Protocol address (IP address) associated with a household device;
   a private IP address associated with a household device; and
   a media access control (MAC) address associated with a household device.

4. The method of claim 1, wherein generating a device-user graph based on identification of the household devices and corresponding household device users comprises:
   representing each identified household device as a first type of node in the device-user graph;
   representing each identified household device user as a second type of node in the device-user graph; and
   adding a connection between each identified household device and its corresponding household device user.

5. The method of claim 1, wherein the device-user graph associated with the household has information of at least one of:
   information describing each identified household device in the household;
   information describing each user who has used one or more identified household devices in the household;
   information describing each connection between an identified household device and each corresponding user;
   a sync-up history associated with each identified household device; a sync-up history associated with each household device user; and a combination thereof.

6. The method of claim 1, wherein generating a device-user graph based on identification of the household devices and corresponding household device users further comprises:
   generating a sync-up history associated with each identified household device represented in the device-user graph, the sync-up history associated with an identified household device describing each usage of the household device by one or more corresponding household device users and a timestamp of each usage.

7. The method of claim 1, wherein generating a device-user graph based on identification of the household devices and corresponding household device users further comprises:
   generating a sync-up history associated with each identified household device user represented in the device-user graph, the sync-up history associated with an identified household device user describing each usage by the identified household device user of one or more household devices and a timestamp of each usage.

8. The method of claim 1, wherein identifying one or more of the corresponding household device users as one or more users of the online system by searching a user profile store maintained by the online system comprises:
   comparing information describing each identified household device user with information in a user profile in the user profile store; and responsive to a match between information identifying an identified household device user and information in the user profile identifying a user of the online system, identifying the household device user as a user of the online system.

9. A non-transitory computer-readable medium comprising computer program instructions, the computer program instructions when executed by a computer processor causes the processor to perform the steps including:
receiving, from one or more user devices by an online system, signals broadcasted from one or more household devices in a household and detected by the one or more user devices, the signals broadcasted from a household device having information uniquely identifying the household device and information describing usage of the household device;
identifying the one or more household devices based on the information uniquely identifying the household devices and users of the identified household devices in the household based on the information describing the usage of the household devices;
generating a device-user graph associated with the household device based on identification of the household devices and corresponding household device users;
identifying one or more of the corresponding household device users as one or more users of the online system by searching a user profile store maintained by the online system, each identified user of the online system having a user profile in the user profile store; and
providing content for presentation by the online system to each identified user of the online system, the content selected based on information in the user profile and the device-user graph of the identified user.

10. The non-transitory computer-readable storage medium of claim 9, wherein identifying the one or more household devices based on the information uniquely identifying the household devices and users of the identified household devices in the household based on the information describing the usage of the household devices comprises:
analyzing the signals broadcasted from the one or more household devices in the household to obtain information describing the one or more household devices; and
analyzing signals broadcasted from the one or more household devices in the household to obtain information describing the usage of the one or more household devices by one or more corresponding users of the household devices.

11. The non-transitory computer-readable storage medium of claim 10, wherein the information describing the one or more household devices comprises at least one of:
a device universally unique identifier (UUID) uniquely identifying a household device; a public Internet Protocol address (IP address) associated with a household device;
a private IP address associated with a household device; and
a media access control (MAC) address associated with a household device.

12. The non-transitory computer-readable storage medium of claim 9, wherein generating a device-user graph based on identification of the household devices and corresponding household device users comprises:
representing each identified household device as a first type of node in the device-user graph;
representing each identified household device user as a second type of node in the device-user graph; and
adding a connection between each identified household device and its corresponding household device user.

13. The non-transitory computer-readable storage medium of claim 9, wherein the device-user graph associated with the household has information of at least one of:
information describing each identified household device in the household;
information describing each user who has used one or more identified household devices in the household;
information describing each connection between an identified household device and each corresponding user;
a sync-up history associated with each identified household device; a sync-up history associated with each household device user; and a combination thereof.

14. The non-transitory computer-readable storage medium of claim 9, wherein generating a device-user graph based on identification of the household devices and corresponding household device users further comprises:
generating a sync-up history associated with each identified household device represented in the device-user graph, the sync-up history associated with an identified household device describing each usage of the household device by one or more corresponding household device users and a timestamp of each usage.

15. The non-transitory computer-readable storage medium of claim 9, wherein generating a device-user graph based on identification of the household devices and corresponding household device users further comprises:
generating a sync-up history associated with each identified household device user represented in the device-user graph, the sync-up history associated with an identified household device user describing each usage by the identified
household device user of one or more household devices and a timestamp of each usage.

16. The non-transitory computer-readable storage medium of claim 9, wherein identifying one or more of the corresponding household device users as one or more users of the online system by searching a user profile store maintained by the online system comprises:
comparing information describing each identified household device user with information in a user profile in the user profile store; and
responsive to a match between information identifying an identified household device user and information in the user profile identifying a user of the online system, identifying the household device user as a user of the online system.

* * * * *